(12) United States Patent
Kajiwara

(10) Patent No.: US 8,394,517 B2
(45) Date of Patent: Mar. 12, 2013

(54) FUEL CELL SYSTEM AND CONTROL METHOD OF THE SYSTEM

(75) Inventor: Shigeto Kajiwara, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 578 days.

(21) Appl. No.: 12/664,852

(22) PCT Filed: Jul. 17, 2008

(86) PCT No.: PCT/JP2008/063331
§ 371 (c)(1),
(2), (4) Date: Dec. 15, 2009

(87) PCT Pub. No.: WO2009/011456
PCT Pub. Date: Jan. 22, 2009

(65) Prior Publication Data
US 2010/0173210 A1    Jul. 8, 2010

(30) Foreign Application Priority Data
Jul. 17, 2007   (JP) .................. 2007-185921

(51) Int. Cl.
*H01M 8/04* (2006.01)
(52) U.S. Cl. .............. 429/9; 429/430; 429/450
(58) Field of Classification Search .............. 429/9, 430, 429/450
See application file for complete search history.

(56) References Cited

U.S. PATENT DOCUMENTS

| | | | |
|---|---|---|---|
| 6,524,733 B1* | 2/2003 | Nonobe | 429/7 X |
| 2006/0003205 A1* | 1/2006 | Yoshida et al. | 429/23 |
| 2006/0257698 A1* | 11/2006 | Ishikawa et al. | 429/23 |
| 2007/0054165 A1* | 3/2007 | Yoshida et al. | 429/23 |

FOREIGN PATENT DOCUMENTS

| | | |
|---|---|---|
| DE | 100 07 973 A1 | 9/2000 |
| JP | 2004-172028 A | 6/2004 |
| JP | 2005-026054 A | 1/2005 |
| JP | 2005-071797 A | 3/2005 |
| JP | 2006-351506 A | 12/2006 |
| JP | 2007-220462 A | 8/2007 |
| JP | 2007-257956 A | 10/2007 |

\* cited by examiner

*Primary Examiner* — Stephen J. Kalafut
(74) *Attorney, Agent, or Firm* — Kenyon & Kenyon LLP

(57) ABSTRACT

A fuel cell system comprises a fuel cell, a reactant gas supply device, and a capacitor which supplies a power to various devices when the fuel cell is in a temporary power generation stop state. The fuel cell system drives the reactant gas supply device based on a predetermined current instruction value to supply a reactant gas to the fuel cell, thereby generating the power. Such a fuel cell system comprises a control device which judges whether or not the current instruction value is below a water balance zero current value when the water content of the fuel cell is below a predetermined threshold and the stored electric charge of the capacitor is a predetermined threshold or more. If affirmative judgment is obtained, the control device switches the power generation state of the fuel cell to the temporary power generation stop state.

5 Claims, 3 Drawing Sheets

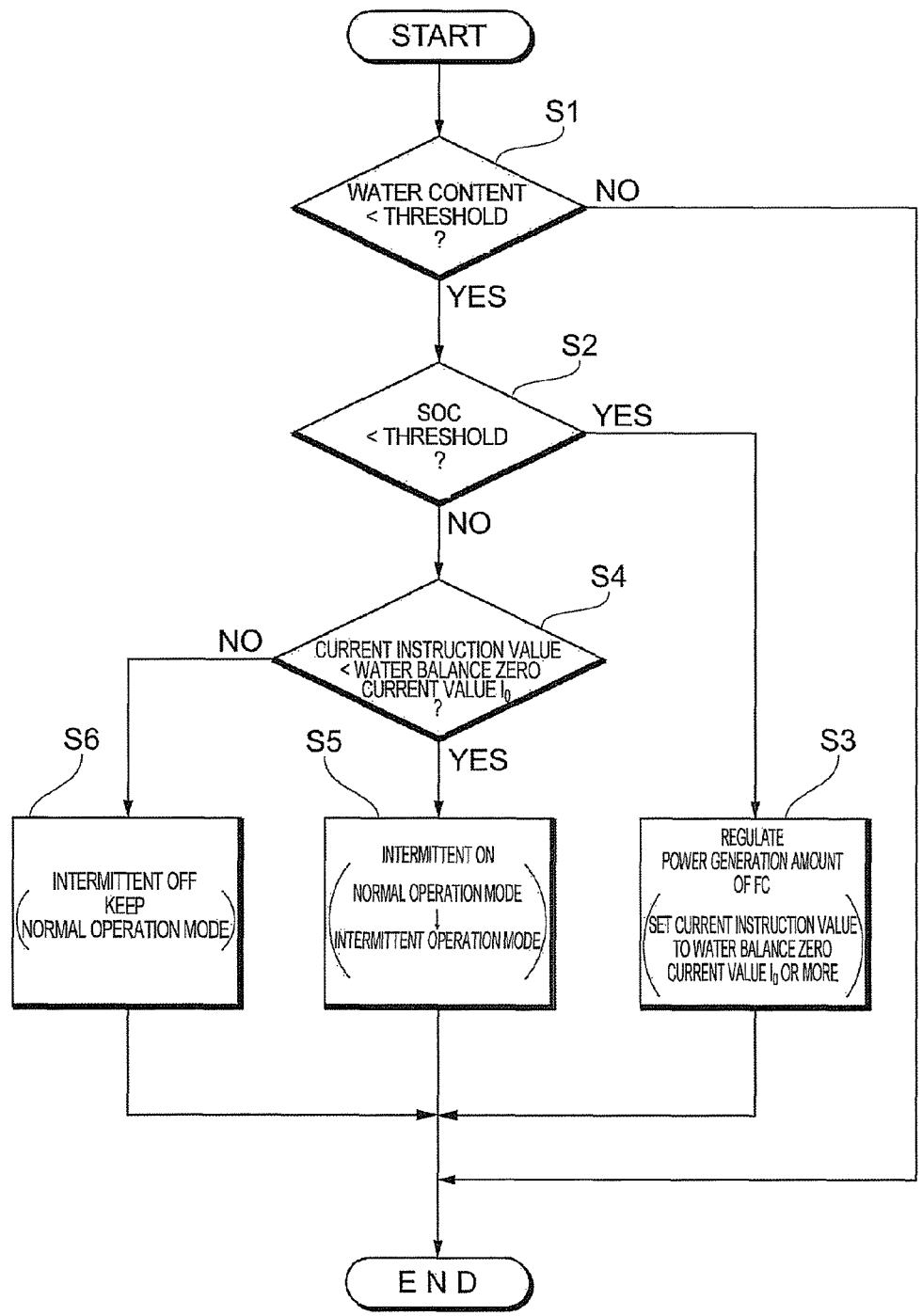

FUEL CELL SYSTEM AND CONTROL METHOD OF THE SYSTEM

This is a 371 national phase application of PCT/JP2008/063331 filed 17 Jul. 2008, which claims priority to Japanese Patent Application No. 2007-185921 filed 17 Jul. 2007, the contents of which are incorporated herein by reference.

TECHNICAL FIELD

The present invention relates to a fuel cell system and a control method of the system.

BACKGROUND ART

Heretofore, a fuel cell system including a fuel cell for receiving a supplied reactant gas (a fuel gas and an oxidizing gas) to generate a power has been put to practical use. When the fuel cell system generates the power, water is formed in the fuel cell by an electrochemical reaction. In an environment at a low temperature below the freezing point or the like, in a case where the fuel cell is stopped and left to stand while the water remains in the fuel cell, a start performance at the next start deteriorates owing to the freezing of the water on occasion. Therefore, various technologies for decreasing a water content in the fuel cell have presently been suggested.

On the other hand, to efficiently generate the power in the fuel cell, the wet state of an electrolytic film constituting the fuel cell needs to be kept. Consequently, in recent years, a technology has been suggested in which the power generation of the fuel cell is forcibly continued while controlling the water content of the fuel cell, to keep the wet state of the fuel cell (e.g., see Japanese Patent Application Laid-Open No. 2005-26054).

DISCLOSURE OF THE INVENTION

Meanwhile, a fuel cell system is provided with a reactant gas supply device (e.g., an air compressor for supplying air as an oxidizing gas) for supplying a reactant gas to a fuel cell. Heretofore, such a reactant gas supply device has been driven and controlled based on a predetermined current instruction value to supply the reactant gas to the fuel cell, thereby generating a power.

However, in a conventional fuel cell system disclosed in Japanese Patent Application Laid-Open No. 2005-26054 described above, in a low current power generation region where the current instruction value is below a water balance zero current value (a current value when water balance in the fuel cell becomes zero), the constant amount of the reactant gas is supplied to the fuel cell owing to a mechanical restriction on the reactant gas supply device, so that the fuel cell might have an overdry state.

The present invention has been developed in view of such a situation, and an object thereof is to suppress the overdrying of a fuel cell in a fuel cell system which drives a reactant gas supply device such as a compressor to supply a reactant gas to a fuel cell, thereby generating a power.

To achieve the above object, the fuel cell system according to the present invention is a fuel cell system which comprises a fuel cell, a reactant gas supply device, and a capacitor to supply a power to various devices when the fuel cell is in a temporary power generation stop state, the fuel cell system being configured to drive the reactant gas supply device based on a predetermined current instruction value, to supply a reactant gas to the fuel cell, thereby generating the power, the fuel cell system further comprising: a control device which judges whether or not the current instruction value is below a water balance zero current value when the water content of the fuel cell is below a predetermined threshold and the stored electric charge of the capacitor is a predetermined threshold or more and which switches the power generation state of the fuel cell to the temporary power generation stop state when affirmative judgment is obtained.

Moreover, a control method according to the present invention is a control method of a fuel cell system including a fuel cell, a reactant gas supply device, and a capacitor to supply a power to various devices when the fuel cell is in a temporary power generation stop state, the fuel cell system being configured to drive the reactant gas supply device based on a predetermined current instruction value, to supply a reactant gas to the fuel cell, thereby generating the power, the control method comprising: a first step of judging whether or not the current instruction value is below a water balance zero current value when the water content of the fuel cell is below a predetermined threshold and the stored electric charge of the capacitor is a predetermined threshold or more; and a second step of switching the power generation state of the fuel cell to the temporary power generation stop state when affirmative judgment is obtained in the first step.

According to such a constitution and method, when the fuel cell is dry (the water content is below the predetermined threshold), the stored electric charge of the capacitor is comparatively large (the predetermined threshold or more) and the current instruction value is small (below the water balance zero current value), the power generation state of the fuel cell can be switched to the temporary power generation stop state. Therefore, even when the flow rate of the reactant gas to be supplied from the reactant gas supply device cannot be set to a predetermined lower limit flow rate or less owing to a mechanical restriction, on such conditions as to dry the fuel cell, the reactant gas supply device can automatically be stopped, and the supply of the reactant gas to the fuel cell can temporarily be stopped. In consequence, the overdrying of the fuel cell can be suppressed. It is to be noted that "the power generation state" is a state in which the fuel cell continuously generates the power, and "the temporary power generation stop state" is a state in which the power generation by the fuel cell is temporarily stopped.

In the fuel cell system, it is possible to employ the control device which keeps the power generation state of the fuel cell while the current instruction value is set to the water balance zero current value or more, in a case where the water content of the fuel cell is below the predetermined threshold and the stored electric charge of the capacitor is below the predetermined threshold.

Moreover, the control method of the fuel cell system can comprise a third step of keeping the power generation state of the fuel cell while the current instruction value is set to the water balance zero current value or more, in a case where the water content of the fuel cell is below the predetermined threshold and the stored electric charge of the capacitor is below the predetermined threshold.

In a case where such a constitution and method are employed and when the fuel cell is dry (the water content is below the predetermined threshold) and the charging amount of the capacitor is small (below a predetermined threshold), the power generation state of the fuel cell can be kept while the current instruction value is set to the water balance zero current value or more. Therefore, the overdrying of the fuel cell is suppressed, and the charging of the capacitor can be realized.

Moreover, in the fuel cell system, an air compressor for supplying the oxidizing gas to the fuel cell can be employed as the reactant gas supply device.

According to the present invention, in the fuel cell system which drives a reactant gas supply device such as the air compressor to supply the reactant gas to the fuel cell, thereby generating the power, the overdrying of the fuel cell can be suppressed.

BRIEF DESCRIPTION OF THE DRAWINGS

FIG. 4 is a flow chart showing a control method of the fuel cell system according to the embodiment of the present invention.

BEST MODE FOR CARRYING OUT THE INVENTION

Hereinafter, a fuel cell system 1 according to an embodiment of the present invention will be described with reference to the drawings. In the present embodiment, there will be described an example in which the present invention is applied to a car-mounted power generation system of a fuel cell vehicle.

Figure 1:
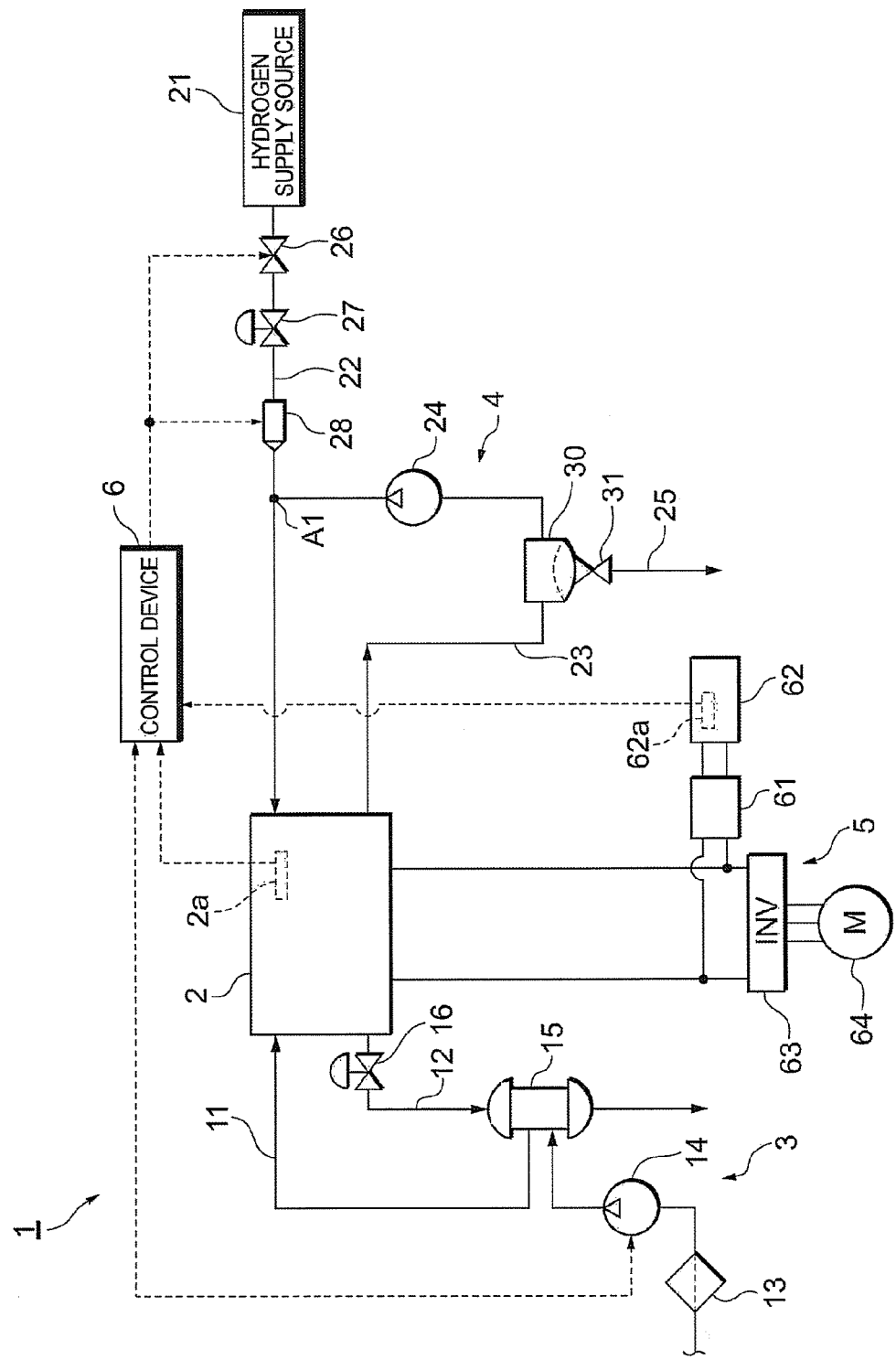
FIG. 1 is a constitution diagram of a fuel cell system according to the present embodiment.

As shown in FIG. 1, the fuel cell system 1 according to the present embodiment includes a fuel cell 2 which receives a supplied reactant gas (an oxidizing gas and a fuel gas) to generate a power; an oxidizing gas piping system 3 which supplies air as the oxidizing gas to the fuel cell 2; a hydrogen gas piping system 4 which supplies a hydrogen gas as the fuel gas to the fuel cell 2; a power system 5 which charges or discharges the power of the system; and a control device 6 which generally controls the whole system.

The fuel cell 2 is constituted of, for example, a solid polymer electrolyte type, and includes a stack structure in which a large number of unitary cells are stacked. Each unitary cell of the fuel cell 2 has an air pole on one face of an electrolyte constituted of an ion exchange membrane, and a fuel pole on the other face of the electrolyte, and further has a pair of separators which sandwich the air pole and the fuel pole from both sides. The fuel gas is supplied to a fuel gas passage of one separator, the oxidizing gas is supplied to an oxidizing gas passage of the other separator, and the fuel cell 2 generates a power from the supplied gases. To the fuel cell 2, a water content sensor 2a for detecting the amount of water (the water content) included in the electrolyte constituting the unitary cell is attached. Information on the water content detected by the water content sensor 2a is input into the control device 6, and used for the control of the power generation in the fuel cell 2.

The oxidizing gas piping system 3 has an air supply passage 11 through which the oxidizing gas to be supplied to the fuel cell 2 flows, and an exhaust passage 12 through which an oxidizing off gas discharged from the fuel cell 2 flows. The air supply passage 11 is provided with an air compressor 14 which takes the oxidizing gas through a filter 13, and a humidifier 15 which humidifies the oxidizing gas to be forwarded under pressure by the air compressor 14. The oxidizing off gas flowing through the exhaust passage 12 passes through a back pressure regulation valve 16, is subjected to water exchange in the humidifier 15, joins a hydrogen off gas in a dilution unit (not shown) to dilute the hydrogen off gas, and is finally discharged as an exhaust gas from the system to the atmosphere. The air compressor 14 corresponds to one embodiment of a reactant gas supply device in the present invention.

Figure 2:
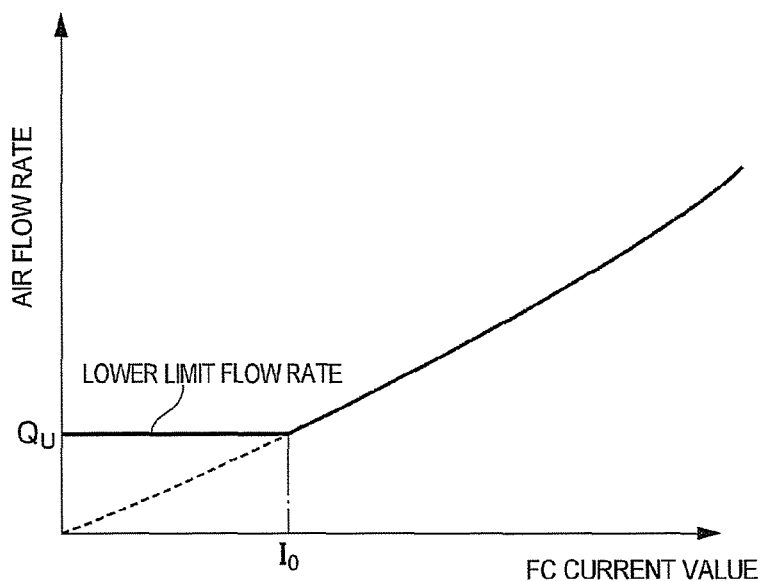
FIG. 2 is a map showing a relation between the current value of a fuel cell and the flow rate of air to be supplied from an air compressor.
Figure 3:
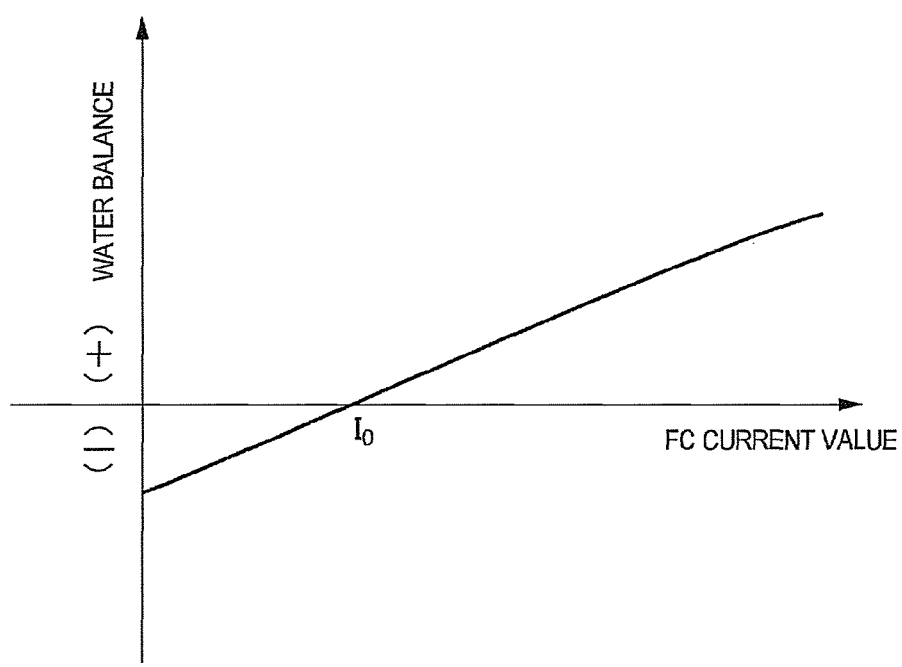
FIG. 3 is a map showing a relation between the current value of the fuel cell and water balance in the fuel cell.

In the present embodiment, the control device 6 drives and controls the air compressor 14 based on a predetermined current instruction value to regulate the flow rate (the air flow rate) of air to be supplied to the fuel cell 2. In this case, as shown in FIG. 2, owing to a mechanical restriction on the air compressor 14, the flow rate of the air to be supplied from the air compressor 14 to the fuel cell 2 cannot be set to a predetermined lower limit flow rate $Q_U$ or less. When the current instruction value decreases and the flow rate of the air to be supplied from the air compressor 14 reaches the lower limit flow rate $Q_U$, as shown in FIG. 3, water balance in the fuel cell 2 becomes zero or negative. Therefore, when such low current power generation continues for a long time, the drying of the fuel cell 2 proceeds. It is to be noted that the maximum value of the current value when the flow rate of the air to be supplied from the air compressor 14 is the lower limit flow rate $Q_U$ is a current value (a water balance zero current value $I_0$) at which the water balance of the fuel cell 2 becomes zero.

The hydrogen gas piping system 4 has a hydrogen supply source 21; a hydrogen supply passage 22 through which the hydrogen gas to be supplied from the hydrogen supply source 21 to the fuel cell 2 flows; a circulation passage 23 which returns the hydrogen off gas (a fuel off gas) discharged from the fuel cell 2 to a joining part A1 of the hydrogen supply passage 22; a hydrogen pump 24 which forwards the hydrogen off gas under pressure in the circulation passage 23 to the hydrogen supply passage 22; and a gas/water discharge passage 25 branched from and connected to the circulation passage 23.

The hydrogen supply source 21 is constituted of, for example, a high pressure tank, a hydrogen occluded alloy or the like, and can receive the hydrogen gas with a predetermined pressure (e.g., 35 MPa or 70 MPa). It is to be noted that the hydrogen supply source 21 may be constituted of a reformer which forms a hydrogen-rich reformed gas from a hydrocarbon-based fuel, and a high-pressure gas tank which brings the reformed gas formed by the reformer into a high-pressure state to accumulate the pressure. Moreover, the tank having the hydrogen occluded alloy may be employed as the hydrogen supply source 21.

The hydrogen supply passage 22 is provided with a shut valve 26 which shuts or allows the supply of the hydrogen gas from the hydrogen supply source 21, a regulator 27 which regulates the pressure of the hydrogen gas, and an electromagnetic driving type on/off valve 28 which regulates the pressure, the flow rate or the like of the hydrogen gas to be supplied to the fuel cell 2. When the shut valve 26 is opened, the hydrogen gas flows from the hydrogen supply source 21 to the hydrogen supply passage 22. The pressure of the hydrogen gas is finally decreased to, for example, about 200 kPa by the regulator 27 or the on/off valve 28, and the gas is supplied to the fuel cell 2. The operation of the shut valve 26 and the on/off valve 28 is controlled by the control device 6.

The circulation passage 23 is connected to the gas/water discharge passage 25 via a gas-liquid separator 30 and a gas/water discharge valve 31. The gas-liquid separator 30 collects water from the hydrogen off gas. The gas/water discharge valve 31 operates in accordance with a command from the control device 6 to discharge (purge), to the outside, the water collected by the gas-liquid separator 30 and the hydrogen off gas (the fuel off gas) including impurities in the circulation passage 23. The hydrogen off gas discharged through the gas/water discharge valve 31 and the gas/water discharge passage 25 joins the oxidizing off gas (air) of the exhaust passage 12 in a dilution unit (not shown) to be diluted. Moreover, the circulation passage 23 is provided with the hydrogen pump 24 which pressurizes the hydrogen off gas in the circulation passage 23 to forward the gas to a hydrogen supply passage 22 side. The hydrogen pump 24 is driven by a motor (not shown) to circulate and supply the hydrogen gas from a circulation system to the fuel cell 2.

The power system 5 includes a high voltage DC/DC converter 61, a battery 62, a traction inverter 63, a traction motor 64, an inverter for various auxiliary devices (not shown) and the like. The high voltage DC/DC converter 61 is a direct-current voltage converter, and has a function of regulating a direct-current voltage input from the battery 62 to output the voltage to a traction inverter 63 side and a function of regulating a direct-current voltage input from the fuel cell 2 or the traction motor 64 to output the voltage to the battery 62. These functions of the high voltage DC/DC converter 61 realize the charging/discharging of the battery 62. Moreover, the high voltage DC/DC converter 61 controls the output voltage of the fuel cell 2.

The battery 62 is controlled by a battery computer (not shown) to charge a surplus power and to supply the power to the traction motor 64 and auxiliary devices, and is one embodiment of a capacitor in the present invention. The battery 62 performs power assist (supplies the power to various devices) during immediate acceleration or in an intermittent operation mode. It is to be noted that the intermittent operation mode is an operation mode in which the power generation of the fuel cell 2 is temporarily halted during a low load operation such as idling, low speed running or regenerative braking, the power is supplied from the battery 62 to a load device such as the traction motor 64, and the hydrogen gas and air are intermittently supplied to the fuel cell 2 to such an extent that an open circuit voltage can be kept. The intermittent operation mode corresponds to a temporary power generation stop state in the present invention. As the battery 62, for example, a nickel hydrogen battery or a lithium ion battery may be employed.

Moreover, in the present embodiment, an SOC sensor 62a for detecting the state of charge (SOC) of the battery 62 is provided. Information on the charging amount of the battery 62 detected by the SOC sensor 62a is input into the control device 6, and is used for the control of the power generation of the fuel cell system 1.

The traction inverter 63 converts a direct current into a three-phase alternate current to supply the current to the traction motor 64. The traction motor 64 is, for example, a three-phase alternate-current motor, and constitutes a main power source of a vehicle in which the fuel cell system 1 is mounted. The auxiliary device inverter is a motor control section which controls the driving of each motor, and converts the direct current into the three-phase alternate current to supply the current to each motor. The auxiliary device inverter is, for example, a pulse width modulation type PWM inverter, converts the direct-current voltage output from the fuel cell 2 or the battery 62 into the three-phase alternate-current voltage in accordance with a control command from the control device 6, and controls a rotary torque generated by each motor.

The control device 6 detects the operation amount of an acceleration operating member (an accelerator or the like) provided in the vehicle, and receives control information such as a demanded acceleration value (e.g., a demanded power generation amount from a load device such as the traction motor 64) to control the operation of various devices in the system. It is to be noted that in addition to the traction motor 64, the load device generically refers to power consumption devices including an auxiliary device necessary for operating the fuel cell 2 (e.g., a motor for the air compressor 14 or the hydrogen pump 24 or the like); an actuator for use in various devices (a change gear, a wheel control device, a steering device, a suspension device, etc.) associated with the running of the vehicle; and an air conditioning device (an air conditioner), light, audio and the like for a passenger space.

The control device 6 is constituted of a computer system (not shown). Such a computer system includes a CPU, an ROM, an RAM, an HDD, an input/output interface, display and the like, and various control programs recorded in the ROM are read and executed by the CPU to realize various control operations.

Specifically, the control device 6 calculates the current instruction value (the target current value) of the fuel cell 2 based on an accelerator operation amount detected by an accelerator sensor (not shown). Then, the control device 6 drives and controls the air compressor 14 or the on/off valve 28 based on the calculated current instruction value, to regulate the flow rate of the reactant gas to be supplied to the fuel cell 2 (the air as the oxidizing gas and the hydrogen gas as the fuel gas). In consequence, the control device 6 generates the power in accordance with the demanded power generation amount from the load device. Thus, an operation mode in which the fuel cell 2 continuously performs the power generation for supplying the power to the load device is referred to as a normal operation mode. The normal operation mode corresponds to a power generation state in the present invention.

Moreover, the control device 6 keeps the normal operation mode while the current instruction value is set to the water balance zero current value $I_0$ (FIGS. 2 and 3) or more, in a case where the water content of the fuel cell 2 detected by using the water content sensor 2a is below a predetermined threshold and the stored electric charge of the battery 62 detected by using the SOC sensor 62a is below a predetermined threshold. In consequence, the overdrying of the fuel cell 2 can be suppressed.

On the other hand, the control device 6 judges whether or not the current instruction value is below the water balance zero current value $I_0$, when the water content of the fuel cell 2 detected by using the water content sensor 2a is below the predetermined threshold and the stored electric charge of the battery 62 detected by using the SOC sensor 62a is the predetermined threshold or more. Then, the control device 6 switches the operation mode of the fuel cell 2 from the normal operation mode to the intermittent operation mode, in a case where the control device judges that the current instruction value is below the water balance zero current value $I_0$. In consequence, the supply of the air to the fuel cell 2 by the driving of the air compressor 14 can temporarily be stopped, and hence the overdrying of the fuel cell 2 can be suppressed.

Next, a control method of the fuel cell system 1 will be described with reference to the flow chart of FIG. 4.

In the normal operation mode of the fuel cell system 1, the hydrogen gas is supplied from the hydrogen supply source 21 to the fuel pole of the fuel cell 2 through the hydrogen supply passage 22, and the humidified and regulated air is supplied to an oxidizing pole of the fuel cell 2 through the air supply passage 11, whereby the power is generated. In this case, the power (the demanded power generation amount) to be discharged from the fuel cell 2 is calculated by the control device 6, so that the amount of the hydrogen gas and air corresponding to the demanded power generation amount is supplied into the fuel cell 2. In the present embodiment, the overdrying of the fuel cell 2 in such a normal operation mode is suppressed.

First, the control device 6 of the fuel cell system 1 judges whether or not the water content of the fuel cell 2 detected by using the water content sensor 2a is below the predetermined threshold (a water content judgment step: S1). In a case where affirmative judgment is obtained, the control device judges whether or not the stored electric charge of the battery 62 detected by using the SOC sensor 62a is below the predetermined threshold (an stored electric charge judgment step: S2). Then, the control device 6 keeps the normal operation mode while the current instruction value is set to the water balance zero current value $I_0$ or more, in a case where the control device judges in the stored electric charge judgment step S2 that the stored electric charge of the battery 62 is below the predetermined threshold (a power generation amount regulation step: S3).

On the other hand, in a case where the control device 6 judges in the stored electric charge judgment step S2 that the stored electric charge of the battery 62 is the predetermined threshold or more, the control device judges whether or not the current instruction value is below the water balance zero current value $I_0$ (a current judgment step: S4). Then, in a case where the control device 6 judges in the current judgment step S4 that the current instruction value is below the water balance zero current value $I_0$, the control device switches the operation mode of the fuel cell 2 from the normal operation mode to the intermittent operation mode (an intermittent ON step: S5). On the other hand, in a case where the control device 6 judges in the current judgment step S4 that the current instruction value is the water balance zero current value $I_0$ or more, the control device keeps the operation mode of the fuel cell 2 at the normal operation mode as it is (an intermittent OFF step: S6).

It is to be noted that the current judgment step S4 corresponds to a first step in the present invention, and the intermittent ON step S5 corresponds to a second step in the present invention. Moreover, the power generation amount regulation step S3 corresponds to a third step in the present invention.

In the fuel cell system 1 according to the above-mentioned embodiment, when the fuel cell 2 is dry (the water content is below the predetermined threshold), the charging amount of the battery 62 is comparatively large (the predetermined threshold or more) and the current instruction value is small (below the water balance zero current value $I_0$), the operation mode of the fuel cell 2 can be switched from the normal operation mode to the intermittent operation mode. Therefore, even in a system in which the flow rate of the air to be supplied from the air compressor 14 cannot be set to a predetermined lower limit flow rate or less owing to the mechanical restriction, on such conditions as to dry the fuel cell 2, the air compressor 14 can automatically be stopped, and the supply of the air to the fuel cell 2 can temporarily be stopped. In consequence, the overdrying of the fuel cell 2 can be suppressed.

Moreover, in the fuel cell system 1 according to the above-mentioned embodiment, in a case where the fuel cell 2 is dry (the water content is below the predetermined threshold) and the charging amount of the battery 62 is small (below the predetermined threshold), while the current instruction value is set to the water balance zero current value $I_0$ or more, the normal operation mode of the fuel cell 2 can be kept. Therefore, the overdrying of the fuel cell 2 is suppressed, and the charging of the battery 62 can be realized.

It is to be noted that in the above embodiment, there has been described an example in which the normal operation mode is kept while the current instruction value is set to "the water balance zero current value $I_0$ or more", in a case where the fuel cell is dry and the charging amount of the battery is small. However, the normal operation mode can be kept while the current instruction value is set to "a current value at the maximum efficiency point of the fuel cell system". In this case, the overdrying of the fuel cell can more securely be suppressed.

Moreover, in the above embodiment, the water content sensor for detecting the water content of the fuel cell is employed, but there is not any special restriction on the constitution of the water content sensor or a method for judging the threshold of the water content. For example, a constitution (a method) can be employed in which a resistance sensor for detecting the resistance value (the impedance) of the fuel cell is provided, and it is judged that the water content of the fuel cell is below the predetermined threshold, when the resistance value detected by this resistance sensor increases above the predetermined threshold.

INDUSTRIAL APPLICABILITY

As described in the above embodiment, a fuel cell system according to the present invention can be mounted in a fuel cell vehicle, and can be mounted in various mobile bodies (a robot, a ship, an airplane, etc.) other than the fuel cell vehicle. Moreover, the fuel cell system according to the present invention may be applied to a stational power generation system for use as a power generation facility for a construction (a housing, a building or the like).

The invention claimed is:

1. A fuel cell system comprising a fuel cell, a reactant gas supply device, and a battery to supply a power to auxiliary devices when the fuel cell is in a temporary power generation stop state, the fuel cell system being configured to drive the reactant gas supply device based on a predetermined current instruction value to supply a reactant gas to the fuel cell, thereby generating the power, the fuel cell system further comprising:
a control device programmed to judge whether or not the current instruction value is below a water balance zero current value when the water content of the fuel cell is below a predetermined threshold and the stored electric charge of the battery is a predetermined threshold or more and which switches the power generation state of the fuel cell to the temporary power generation stop state when affirmative judgment is obtained.

2. The fuel cell system according to claim 1, wherein the control device keeps the power generation state while the current instruction value is set to the water balance zero current value or more, in a case where the water content of the fuel cell is below the predetermined threshold and the stored electric charge of the battery is below the predetermined threshold.

3. The fuel cell system according to claim 1, wherein the reactant gas supply device is an air compressor which supplies an oxidizing gas to the fuel cell.

4. A control method of a fuel cell system including a fuel cell, a reactant gas supply device, and a battery to supply a power to auxiliary devices when the fuel cell is in a temporary power generation stop state, the fuel cell system being configured to drive the reactant gas supply device based on a predetermined current instruction value, to supply a reactant gas to the fuel cell, thereby generating the power, the control method comprising:
a first step of judging whether or not the current instruction value is below a water balance zero current value when the water content of the fuel cell is below a predetermined threshold and the stored electric charge of the battery is a predetermined threshold or more; and a second step of switching the power generation state of the fuel cell to the temporary power generation stop state when affirmative judgment is obtained in the first step.

5. The control method of the fuel cell system according to claim 4, further comprising:

a third step of keeping the power generation state of the fuel cell while the current instruction value is set to the water balance zero current value or more, in a case where the water content of the fuel cell is below the predetermined threshold and the stored electric charge of the battery is below the predetermined threshold.

* * * * *